US010356401B1

(12) United States Patent
Zhang et al.

(10) Patent No.: US 10,356,401 B1
(45) Date of Patent: Jul. 16, 2019

(54) NOISE CANCELLATION IN A WIRELESS HEAD MOUNTED DISPLAY

(71) Applicant: Facebook, Inc., Menlo Park, CA (US)

(72) Inventors: Rui Zhang, Redwood City, CA (US); Dong Yang, Milpitas, CA (US)

(73) Assignee: FACEBOOK, INC., Menlo Park, CA (US)

( * ) Notice: Subject to any disclaimer, the term of this patent is extended or adjusted under 35 U.S.C. 154(b) by 139 days.

(21) Appl. No.: 15/679,069

(22) Filed: Aug. 16, 2017

(51) Int. Cl.
| | |
|---|---|
| *G09G 5/00* | (2006.01) |
| *H04N 17/04* | (2006.01) |
| *H04N 21/4363* | (2011.01) |
| *H04N 21/442* | (2011.01) |
| *H04N 21/414* | (2011.01) |
| *H04N 13/344* | (2018.01) |

(52) U.S. Cl.
CPC .......... *H04N 17/04* (2013.01); *H04N 13/344* (2018.05); *H04N 21/41407* (2013.01); *H04N 21/43637* (2013.01); *H04N 21/44227* (2013.01)

(58) Field of Classification Search
CPC ......... H04N 5/23206; H04N 21/43615; H04N 7/181; H04N 5/765; H04N 21/43637; H04N 21/4126; H04N 21/44227; H04N 7/185; H04N 19/52; H04L 2012/2841; H04L 5/0064; H04L 67/1097; H04L 12/282; H04L 12/2805; G06F 3/011; G06F 3/005; G06F 3/012; A63F 13/235; A63F 9/24; A63F 13/23; A63F 13/52; A63F 2300/538; A63F 2300/8082; A63F 2300/8094; G09G 2370/16; G09G 2354/00; G09G 2320/106; G09G 2340/0407; G09G 2340/0435; G09G 2360/02; G09G 3/001; G09G 3/003; G09G 5/005; G09G 5/006; G09G 5/12; G09G 5/14
USPC ....................................................... 345/7–9
See application file for complete search history.

(56) References Cited

U.S. PATENT DOCUMENTS

| | | | | |
|---|---|---|---|---|
| 7,950,029 | B2 * | 5/2011 | Andreyko | H04N 7/147 348/377 |
| 2014/0361977 | A1 * | 12/2014 | Stafford | G02B 27/0093 345/156 |
| 2018/0095529 | A1 * | 4/2018 | Tokubo | G06F 3/012 |

* cited by examiner

*Primary Examiner* — Duc Q Dinh
(74) *Attorney, Agent, or Firm* — Kilpatrick Townsend & Stockton LLP

(57) ABSTRACT

A method of operating a VR or AR head mounted display (HMD) system includes obtaining a video performance parameter for a video signal, selecting a clock frequency for video data transfer within the HMD system based on the video performance parameter, detecting one or more available frequency bands for a wireless data connection between a host device and the HMD system, and selecting a frequency band from the one or more available frequency bands for the wireless data connection, based on a predetermined connection suitability parameter for the one or more available frequency bands and based on the selected clock frequency for video data transfer within the HMD system. The method further includes establishing a wireless connection between the host device and the HMD system over the selected frequency band.

20 Claims, 9 Drawing Sheets

| MIPI Frequency | Wireless Connection Band | Connection Suitability Parameter (Does a previously detected desense issue exist?) |
| --- | --- | --- |
| 800 MHz | 2.4 GHz | No |
| 900 MHz | 2.4 GHz | No |
| 1.00 GHz | 2.4 GHz | Yes |
| 1.1 GHz | 2.4 GHz | No |
| 1.2 GHz | 2.4 GHz | Yes |
| 1.3 GHz | 2.4 GHz | No |
| 1.4 GHz | 2.4 GHz | No |
| 1.5 GHz | 2.4 GHz | No |
| 800 MHz | 5.0 GHz | No |
| 900 MHz | 5.0 GHz | No |
| 1.00 GHz | 5.0 GHz | No |
| 1.10 GHz | 5.0 GHz | No |
| 1.20 GHz | 5.0 GHz | No |
| 1.30 GHz | 5.0 GHz | No |
| 1.40 GHz | 5.0 GHz | No |
| 1.50 GHz | 5.0 GHz | No |
| 1.60 GHz | 5.0 GHz | No |
| 1.70 GHz | 5.0 GHz | Yes |

FIG. 5

| | MIPI Frequency 1 (1.4 GHz) | MIPI Frequency 2 (1.2 GHz) | WiFi Band | Video Performance Parameter (VPP) | Secondary Tuning | Power Consumption |
|---|---|---|---|---|---|---|
| 601 { | OK | DO NOT USE | 2.4 GHz | Low | Down/UP | High |
| | OK | DO NOT USE | 2.4 GHz | High | Up | High |
| 603 { | DO NOT USE | OK | 5 GHz | Low | Down/UP | Low |
| | OK | DO NOT USE | 5 GHz | High | Up | High |

FIG. 6

NOISE CANCELLATION IN A WIRELESS HEAD MOUNTED DISPLAY

BACKGROUND

In mobile virtual reality (VR) and augmented reality (AR) systems, the rapidly increasing quality and dynamic nature of content continues to push hardware requirements forward. In addition, ever tightening user experience requirements lead to the need to continually push the boundaries of existing sensing, display, and video processing technology. In particular, both screen resolution and frame rate requirements continue to increase. These two factors taken together lead to increasing performance pressures on display interconnect and interface technology. In addition, as VR/AR gameplay and user experience trend toward more active situations, e.g., that require more physical movement of the user within real space, corded (also referred to as "tethered") systems become more cumbersome and less preferred. Accordingly, there exists a need for head mounted device (HMD) systems that can operate wirelessly yet still have video performance specifications that meet or exceed requirements of next generation content.

SUMMARY

The present disclosure relates generally to systems and methods for noise cancellation in a wireless head mounted display, e.g., as employed in a VR/AR system. More particularly, one or more embodiments provide for systems and methods to reduce wireless desense caused by high-frequency radiation that is emitted from components of the display interface of the HMD.

In some embodiments, a method of operating a head mounted display (HMD) system includes obtaining a video performance parameter for a video signal, selecting a clock frequency for video data transfer within the HMD system based on the video performance parameter, and detecting one or more available frequency bands for a wireless data connection between a host device and the HMD system. The method further includes, selecting a frequency band from the one or more available frequency bands for the wireless data connection, based on a predetermined connection suitability parameter for the one or more available frequency bands and based on the selected clock frequency for video data transfer within the HMD system and establishing a wireless connection between the host device and the HMD system over the selected frequency band.

In some embodiments, the method further includes receiving video data wirelessly from the host device, wherein the video data corresponds to the video data frames to be displayed on the display of the HMD system and measuring, while receiving the video data wirelessly from the host device, a wireless connection quality parameter. The method further includes, altering the clock frequency from a first clock frequency to a second clock frequency, based on the wireless connection quality parameter and the video performance parameter, to improve a connection quality of the wireless connection.

In some embodiments, the method includes receiving video data wirelessly from the host device, wherein the video data corresponds to the video data frames to be displayed on the display of the HMD system and measuring, while receiving the video data wirelessly from the host device, a wireless connection quality parameter. The method further includes altering the clock frequency from a first clock frequency to a second clock frequency in response to a change in the video performance parameter from a first video performance parameter to a second video performance parameter, wherein the second clock frequency is chosen based on a value of the wireless connection quality parameter measured at the second clock frequency and based on the second video performance parameter.

In some embodiments, a method of operating a head mounted display (HMD) system includes establishing a wireless connection to a host device, wherein the host device is external to the HMD system, and wherein the wireless connection uses a wireless frequency band required by the host device. The method further includes obtaining a video performance parameter for a video signal, wherein the video signal corresponds to video data frames to be displayed on a display the HMD system and selecting a clock frequency for video data transfer within the HMD system based on the video performance parameter and a predetermined connection suitability parameter for the wireless frequency band.

In some embodiments, the method further includes receiving video data wirelessly from the host device, wherein the video data corresponds to the video data frames to be displayed on the display of the HMD system, measuring, while receiving the video data wirelessly from the host device, a wireless connection quality parameter, and altering the clock frequency from a first clock frequency to a second clock frequency, based on the wireless connection quality parameter and the video performance parameter, to improve a connection quality of the wireless connection.

In some embodiments, a HMD system includes an electronic display that displays video data frames, a wireless receiver for receiving the video data frames from a host device over a wireless connection, and one or more digital processors. The digital processors are configured to establish the wireless connection to the host device, wherein the wireless connection uses a wireless frequency band required by the host device, obtain a video performance parameter for a video signal, wherein the video signal corresponds to the video data frames to be displayed on the electronic display of the HMD system, and select a clock frequency for video data transfer within the HMD system based on the video performance parameter and a predetermined connection suitability parameter for the wireless frequency band.

In some embodiments, the one or more digital processors are further configured to receive video data wirelessly from the host device, wherein the video data corresponds to the video data frames to be displayed on the electronic display of the HMD system, measure, while receiving the video data wirelessly from the host device, a wireless connection quality parameter, and alter the clock frequency from a first clock frequency to a second clock frequency, based on the wireless connection quality parameter and the video performance parameter, to increase a sensitivity of a wireless receiver to the received video data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIG. 5 shows a lookup table employed in-memory in an HMD system according to certain embodiments;

FIG. 6 shows a table that summarizes the logic that can be employed for fine-tuning of the interface clock in order to minimize the risk of desense according to certain embodiments;

DETAILED DESCRIPTION

Figure 1:
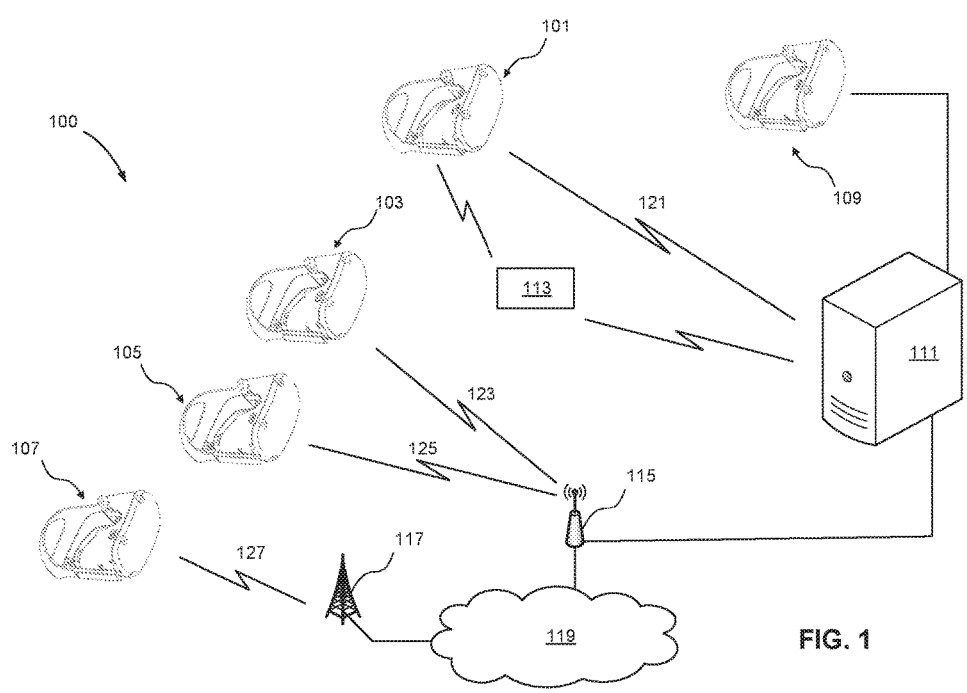
FIG. 1 shows a head mounted display (HMD) system according to certain embodiments.

In accordance with one or more embodiments, the methods and systems disclosed herein reduce the effect of display interface-induced desense of a wireless receiver in a mobile head mounted device (HMD) system, e.g., as would be employed in a wireless VR and/or AR system. More specifically, one or more embodiments provide for software (e.g., firmware) solutions to combat wireless desense caused by high-frequency radiation that is emitted from the display interface (e.g., interconnects and connectors) of the HMD.

Next generation HMDs for VR and AR often function at relatively high data rates to support high frame rates and/or high-resolution displays, e.g., to support multi-player gaming applications. In some examples, an HMD may need to support interface clock frequencies of 1.2 GHz, 1.4 GHz, or even higher. In addition, next generation HMDs may also support wireless connectivity such as WiFi, LTE, Bluetooth, etc. Wireless connectivity of the HMD to a host device in combination with high frequency display interfaces can pose a serious challenge, because the operating frequency bands for these wireless systems may overlap with harmonics of the HMD's interface clock. When this overlap occurs, a degradation in sensitivity of the wireless of the HMD can result if any of the interface clock power is radiated and picked up by the wireless receiver, a phenomena known as "desense" of the wireless receiver.

Hardware solutions to the desense problem are difficult because of the small form factor for most HMDs that result in the antenna for wireless communications unit likely being in close physical proximity to the display interface connectors and/or signal paths. As a result of the close physical proximity of the wireless and display circuitry, radiation from the display's high-frequency interface clock can be easily picked up by the antenna(s) of the wireless system.

In some embodiments, the system may be aware of the wireless system it is connecting to, e.g., based on the protocol being broadcast from a wireless access point, and then choose from available wireless channels to avoid interference. For example, in some embodiments, before connecting, the HMD can detect the available WiFi channels, e.g., 2.4 GHz and 5.0 GHz, and then choose the appropriate channel so as to not overlap with a harmonic of the display interface clock. Alternatively, for any WiFi channel, the HMD may choose to alter the display interface clock frequency based on one or more performance requirements. For example, for cases that demand a high frame rate, e.g., gaming or video, the display interface clock frequency may be increased to avoid interference with the WiFi connection. In addition, even if high bandwidth is not necessary, the display interface clock frequency may be increased to avoid interference. In this case, data frames can be "blanked" so that a lower data transfer rate can be achieved even with the higher display interface clock frequency. In other cases, if high display bandwidth is not needed, the display interface clock frequency can be reduced to avoid the interference.

In some embodiments, the desense problem can be measured for various combinations of interface clocks and wireless connections and the results stored in memory on the HMD in a lookup table. According to certain embodiments, the table can store various wireless channels and correspond them with preferred display interface clock frequencies. Upon initial connection, the HMD may operate at one of these preferred display interface clock frequencies, but then the HMD can later fine tune the display interface clock frequency to a more optimal frequency based on some figure of merit. In one example, the figure of merit can be obtained from the wireless communications system, e.g., the bit error rate or the like.

FIG. 1 shows a HMD system 100 according to certain embodiments. While the system illustrated here shows HMDs that resemble VR headsets, the system may equally employ HMDs that are configured for AR rather than VR. The system includes one or more head mounted displays, e.g., HMD 101, HMD 103, HMD 105, HMD 107, and HMD 109. Each individual HMD can be connected to one or more endpoints (also referred to herein as "host devices") that provide a video signal to the HMDs. More specifically, the video signal may represent frames of video data (also referred to herein as "video data frames" that are generated from one or more applications running on the end point, e.g., an application may be an application running on a host device, which may be a computer system 111, where the application running on the host device generates one or more frames of video data to be displayed on a display element of the HMD.

According to certain embodiments, the video data can be transmitted wirelessly over a wireless connection from an endpoint to one or more HMDs. For example, computer system 111 can include hardware and circuitry associated with any wireless communications module of a personal area network (PAN) such as those specified under the IEEE 802.15 working group, like Bluetooth and VLC (Visible Light Communication), or others like Zigbee, wireless USB and/or those specified under the Infrared Data Association (IrDA) among others. Accordingly, in some embodiments, HMD 101 can wirelessly communicate directly with computer system 111 via a wireless connection 121. Wireless connection 121 can carry video data from the computer system 111 to the HMD 101 as well as transmit information (such as position and or orientation data) from HMD 101 to computer system 111. In addition, the HMD system 100 can include wireless peripheral device 113, such as a Bluetooth mouse or a game controller, that can wirelessly connect to the HMD 101 and/or the computer system 111.

According to certain embodiments, one or more HMDs can connect wirelessly to one or more endpoints via a wireless local area network (WLAN) by way of a wireless access point 115. FIG. 1 shows HMD 103 wirelessly connected to wireless access point 115, which can be, e.g., a wireless router that operates according to any WLAN protocol, e.g., like those specified under the IEEE 802.11 specification, commonly marketed under the WiFi name. As shown, the wireless access point 115 may be connected to one or more computer systems, e.g., computer system 111. While the connection between wireless access point 115 and computer system 111 is shown to be wired in FIG. 1, it may be either wired or wireless without departing from the scope of the present disclosure. Wireless access point 115 may also be connected to a wide-area-network (WAN) 119 such as the internet or any cloud based system that includes additional endpoints. In such a case, the video data may originate form an endpoint accessible via WAN 119 and distributed to the HMDs 105, 103 through the WLAN depicted here as wireless connections 123 and 125.

According to certain embodiments, one or more HMDs, e.g., HMD 107, may wirelessly connect with a cellular network by way of a wireless connection 127 to a base station 117 that itself may be connected to the broader WAN, internet, and/or cloud. Accordingly, the wireless connection 127 may employ any cellular technology or protocol such as GSM, CDMA, UMTS, LTE, and the like.

Figure 2:
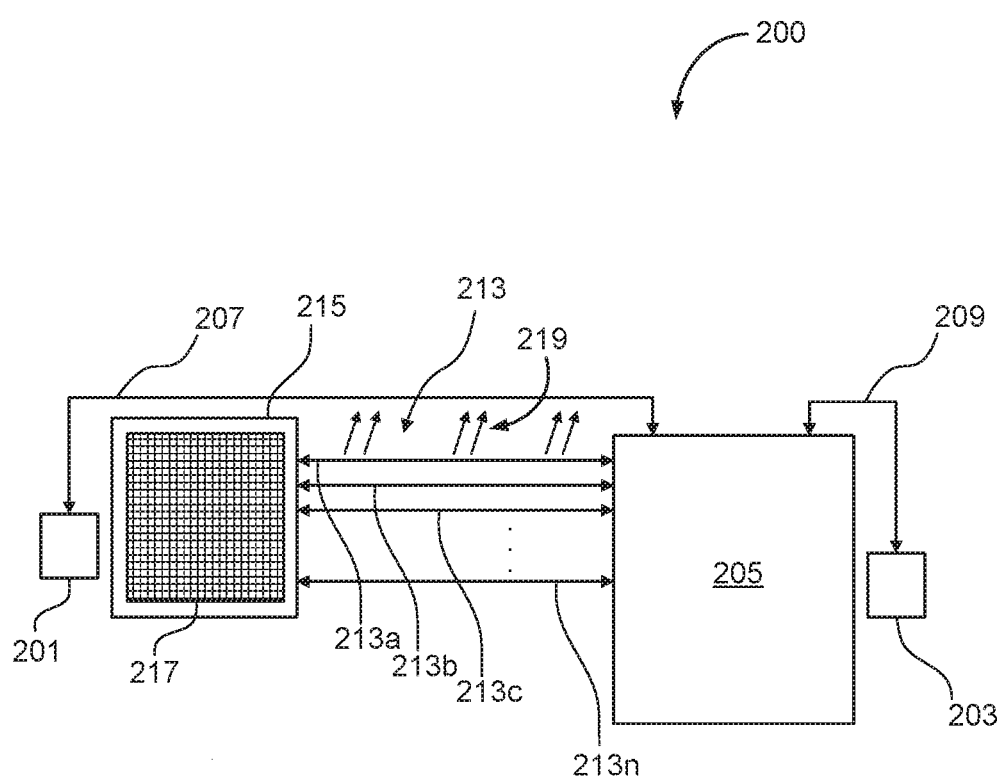
FIG. 2 shows a simplified block diagram of an HMD according to certain embodiments.

FIG. 2 shows a simplified block diagram of a portion of an HMD 200 according to certain embodiments. Specifically FIG. 2 shows an example of a video signal receiver and display drive circuit that is internal to the HMD itself. The HMD 200 includes antennas 201 and 203, which may include one or more WiFi antennas for receiving a wireless signal that includes video frame data that has been wirelessly transmitted from one or more endpoints as described above in reference to FIG. 1. Antennas 201 and 203 are connected to a receiver (not shown) within controller 205 via interconnects 207 and 209, which may be e.g., coaxial cables or the like. Accordingly, controller 205 can receive the video signal that was generated by one or more endpoints running applications (e.g., VR/AR gaming applications) and decode and process that video signal into an output display signal for driving a digital display of electronic display module 215.

Electronic display module 215 includes and electronic display 217 that itself includes an array of pixels, where each pixel can be a discrete light emitting component, or groups of more than one pixel can work in concert to produce a discrete light emitting component. According to certain embodiments, electronic display 217 is a pixel array of an organic light emitting diode (OLED) display device but the electronic display 217 may employ any other electronic display technology without departing from the scope of the present disclosure. The pixel array shown in FIG. 2 illustrates a relatively low density pixel array for the sake of clarity only and one of ordinary skill will appreciate that the disclosure is applicable to a pixel structure of any size, e.g., including millions of pixels.

The electronic display module 215 can further include a number of other components that are not shown here for the sake of simplicity. For example, electronic display module 215 can include a scan driver, a data driver, and a timing controller. According to certain embodiments, the scan driver can apply scan signals to the pixels through a collection of scan lines to enable the rows associated with the activated scan line for display. The data driver can apply data voltages to the pixels through a collection of data lines to provide data voltages to the columns associated with the activated data lines. In some embodiments, a collection of power voltage lines (also not shown) can supply power voltage to the pixels. The timing controller of the electronic display module 215 can derive timing control signals from vertical/horizontal synchronous signals and a clock signal provided by display interconnect 213. According to certain embodiments, the timing control signals are used to control operation timings of the scan driver and the data driver.

Display interconnect 213 may be a multi-conductor ribbon cable or any other interconnect capable of transferring video signals, e.g., as specified by the Mobile Industry Processor Interface (MIPI) display serial interface (DSI), or the like. According to certain embodiments, the display interconnect 213 includes one or more high-speed clock lanes 213*a* and one or more data lanes 213*b*, 213*c*, . . . , 213*n*. While the lanes comprising display interconnect 213 are represented as single lines they may include one or more conductors, e.g., two conductors for differential signaling, as would be appreciated by one of ordinary skill in the art with the benefit of this disclosure.

To provide a sufficiently high data transfer rate for driving a high-resolution display, the frequency of the clock signal travelling on the high-speed clock lane 213*a* can be in the hundreds of MHz or even in the GHz. At these frequencies, the high-frequency clock signal can radiate from the high-speed clock lane into the surrounding enclosure, possibly resulting in detrimental electromagnetic interference within other parts of the HMD circuit. For example, FIG. 2 shows that radiation 219 is radiated by the high-speed clock lane 213*a* and may be coupled into the wireless receiver circuitry via interconnect 207 of antenna 201. In some cases, e.g., when the high speed clock is near 1.2 GHz, harmonics of this frequency, occurring at 2.4 GHz, 3.6 GHz, and so on, may very nearly overlap (in frequency space) with one of the primary WiFi carrier frequencies, e.g., within the 2.4 GHz WiFi band. For example, the first harmonic of a 1.2 GHz high-speed clock signal will directly overlap with the carrier frequency of the 2.4 GHz WiFi signal.

The radiated display clock signal essentially serves to raise the background electrical noise of the WiFi receiver at 2.4 GHz thereby resulting in a loss of receiver sensitivity (where the term "sensitivity" refers to the minimum (lowest power) signal that the receiver can detect). The phenomena of lowering a receiver's sensitivity is referred to as "desense." Depending on how effectively the noise source is coupled to the receiver, the absorbed noise (in this case originating from the high-speed display interconnect and its associated connectors) may have a power that is comparable to the incoming wireless signal at the antenna 201. In such a case, the minimum detectible signal level of the receiver can be elevated to the point that a temporary loss of the wireless connection between the HMD and the computer system can occur.

Figure 3:
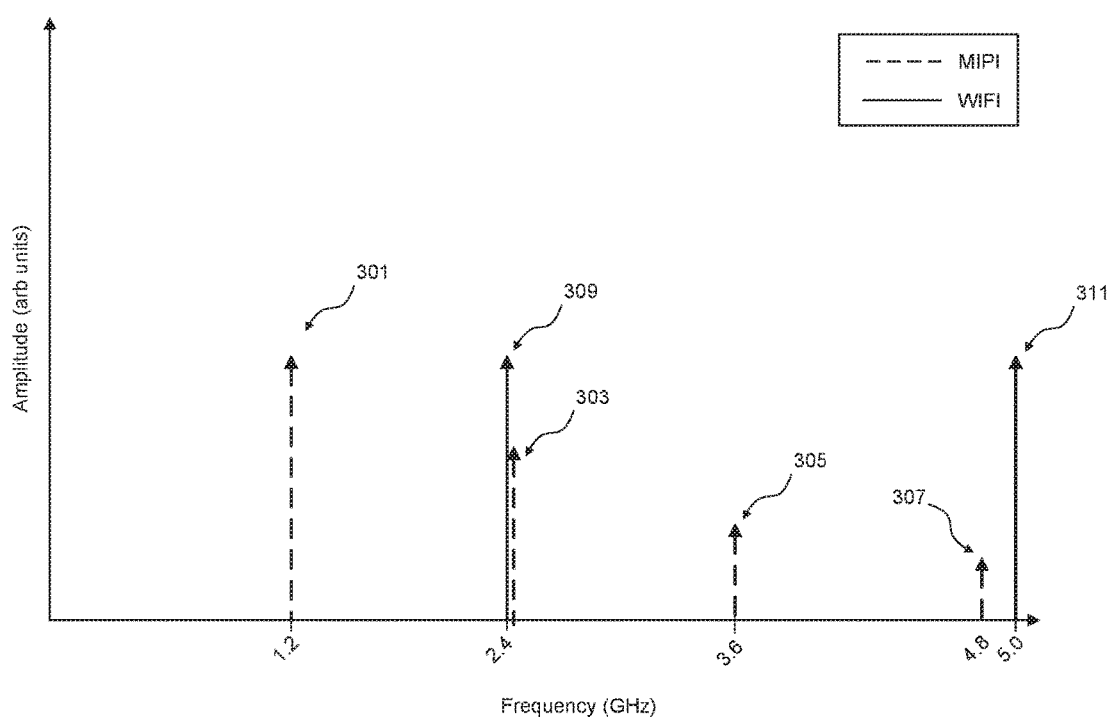
FIG. 3 shows illustrative frequency spectra for various system signals to further aid in the description of the desense problem in an HMD system according to certain embodiments.

FIG. 3 shows illustrative frequency spectra for various system signals to further aid in the description of the desense problem in an HMD system according to certain embodiments. As described above in reference to FIG. 2, a clock of the HMD controller provides a high-speed interface clock signal that travels along an interconnect that connects the controller to the display module of the HMD. Assuming that the display refresh rate is operating at, e.g., 70 frames per second, the display interface clock may need to operate at or near frequency 301 shown in FIG. 3, which can be 1.2 GHz. As with any signal, the high-speed clock signal has its power distributed amongst a primary frequency and one or more harmonic frequencies (also referred to as "harmonics" or "spurs"). In this illustrative example, the first three harmonics of the 1.2 GHz clock are shown as harmonics 303, 305, and 307, at 2.4 GHz, 3.6 GHz, and 4.8 GHz, respectively. The two additional frequencies 309 and 311 shown in FIG. 3 represent frequency bands over which a wireless connection can be made, e.g., a wireless local area network communication systems, e.g., according to the IEEE 802.11 standard commonly referred to as WiFi. In this example, the two frequency bands 309 and 311 are simplified representations of the common WiFi connection bands, occurring at 2.4 GHz and 5.0 GHz, respectively, as would be the case for devices operating according to the 802.11n standard. Of course, these precise frequencies are chosen merely for the sake of illustration and any frequencies may be employed for the wireless connection without departing from the scope of the present disclosure. For example, rather than WiFi, the connection could be made through cellular (3G, 4G, 4G-LTE, etc.), Bluetooth, or any other wireless connection with the associated frequency bands corresponding to the respective standards of the wireless communication being used.

For the illustrative example shown in FIG. 3, the first harmonic 303 of the high-frequency interface clock falls within the 2.4 GHz WiFi band 309. Because the WiFi antenna-receiver system is optimized to receive wireless signals in and around this band, the receiver system will not discriminate between the actual WiFi signal carrying the video frame data and the internally radiated first harmonic of the MIPI clock signal and thus, the pickup of the first harmonic of the MIPI signal will contribute noise to the antenna-receiver system leading to the lowering of the overall sensitivity of the antenna-receiver system, i.e., desense. According to certain embodiments, the desense problem can be overcome by desense prevent logic that is implemented within the controller of the HMD.

According to certain embodiments, desense prevent logic takes as input one or more video performance parameters that parameterize the required performance specification for the video display (e.g., required frame rate and resolution). In addition, the desense prevent logic can also take as input one or more wireless connection parameters that contain information on the availability of wireless carriers for the wireless connection between the host endpoint and the HMD (or peripheral device such as a controller). For example, based on a video performance parameter, the desense prevent logic can preferentially select a WiFi band that will minimize desense. More specifically, the desense prevent logic may check the video performance parameter to see if the current requirements call for a video interface clock near 1.2 GHz. If so, the controller will choose to connect to the WiFi endpoint via the band 311 at 5.0 GHz rather than the band 309 at 2.4 GHz band thereby preventing desense.

According to certain embodiments, the desense prevent logic can also cause the frequency of the video interface clock to be tuned to minimize the risk of desense. For example, if only one WiFi band is available or preferable, then the desense prevent logic will generate a signal to increase or decrease the frequency of the video interface clock within a range that is suitable given the preexisting constraints on video performance. For example, if only band 309 at 2.4 GHz is available for the wireless connection, then the desense prevent logic can increase the video interface clock from 1.2 GHz to 1.3 GHz to ensure that the radiated video interface frequency is outside of the 2.4 GHz WiFi band to reduce the risk of desense.

In another case, video performance considerations may suggest that the video interface clock be set to 1.67 MHz, in which case the third harmonic will be very close to the 5.0 GHz WiFi band and possibly cause desense of the antenna-receiver circuit, if the 5.0 GHz band is used for the wireless connection. Accordingly, in this example, a wireless connection over the 2.4 GHz band would be preferred from a purely desense perspective, but it could also be that a connection of the 5.0 GHz band is required for other reasons, in which case the controller may either increase or decrease video interface clock to avoid desense. According to certain embodiments, a decrease in clock frequency can be preferred by the desense prevent logic for power consumption reasons (higher clock frequencies tend to require more power). Alternatively, if video performance considerations trump power consumption, e.g., based on the value of the video performance parameter, then the desense prevent logic can increase the clock signal even at the expense of higher power consumption.

According to certain embodiments, a video performance parameter may be provided as input to the desense prevent logic to inform the logic of the performance requirements for the display, e.g., the minimum video data transfer rate of the video interface, the minimum range of frame rates for suitable displaying content on the display of the HMD, and the like. Such performance considerations can be "loose," i.e., a broad frequency range of video interface clock frequencies and/or a relatively low frequency video interface clock may be suitable). For example, the display of static images on the display of the HMD might require only loose performance considerations. Alternatively, performance considerations can be "tight," i.e., a narrow range of video interface clock frequencies and/or a relatively high frequency video interface clock may be required. For example, a narrow range of video interface clock frequencies may be required when displaying dynamic or rapidly changing images on the display of the HMD device during a gaming application or when a user is moving or looking around within a virtual environment. According to certain embodiments, if video performance considerations are tight, the desense prevent logic may choose to switch the wireless frequency band, e.g., from 5 GHz to 2.4 GHz to reduce desense rather than tune the video interface clock. Additional details regarding the desense reduction protocol are described in more detail below.

Figure 4:
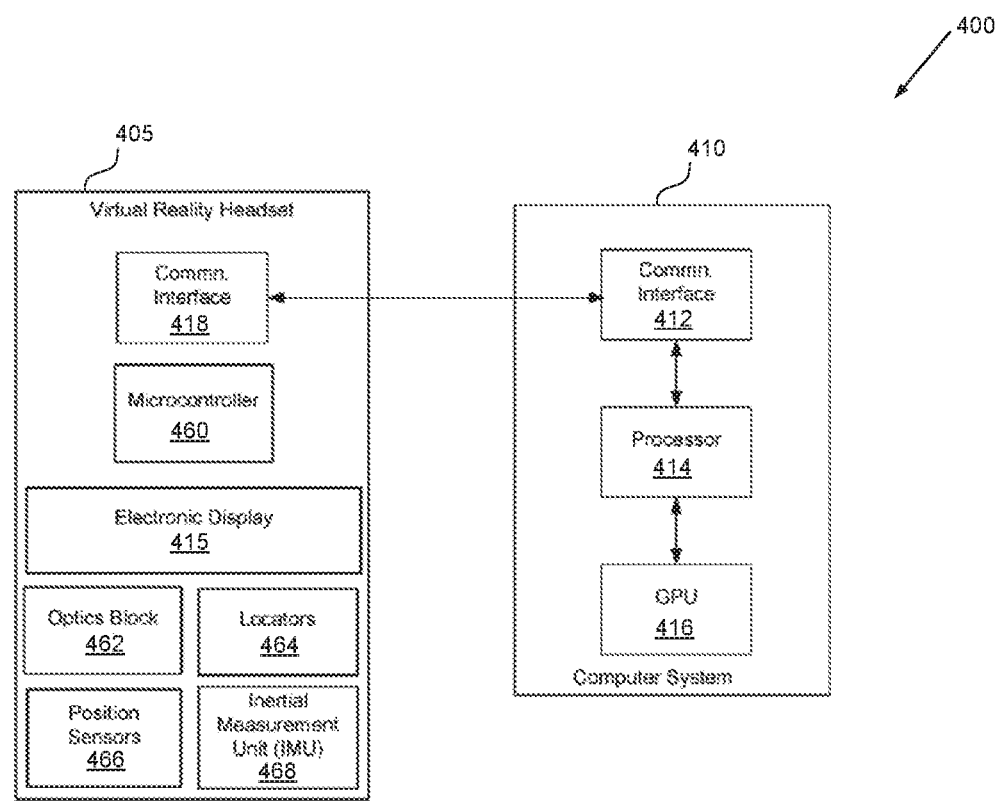
FIG. 4 is a block diagram of an HMD system according to certain embodiments.

FIG. 4 is a block diagram of an HMD system 400 for implementing the desense prevent logic, according to some embodiments. The system includes, among other components, an HMD 405, e.g., an AR/VR headset or the like, and a computer system 410. The computer system 410 includes, among other components, a processor 414, a communications interface 412, and a Graphical Processing Unit (GPU) 416. While the embodiment shown in FIG. 4 is a system with HMD 405 that is separate from computer system 410, according to certain embodiments, the computer system blocks shown in FIG. 4 may be integrated within the HMD. According to certain embodiments, the HMD may include its own dedicated GPU for generating video data and its own processors for running AR/VR applications, or the like. Such an HMD could be completely "stand-alone" with respect to the requires sensors, memory, and compute resources, and also is capable of connecting to a wireless network, e.g., in order to download applications and updates, or e.g., to take part in a multiplayer application, game, and the like.

The processor 414 of computer system 410 may be a general purpose processor including cache and having instructions, for example, an operating system and associated drivers, for interfacing with the HMD 405.

The communications interface 412 enables input and output to external systems, like the HMD 405, as shown here. Other possibilities include input and output from peripherals such as controllers, mice, etc. The communications interface 412 may enable a communications channel for the transfer of video frame data according to any wireless protocol, such as WiFi, Bluetooth, and the like. Communications interface 412 can also support traditionally wired communications channels such as HDMI, USB, VGA, DVI, or DisplayPort. The communications interface 412 may support a single connection channel or several distinct communications channels operating together or independently. The communications interface 412 may include connections (wired and/or wireless) such as a USB connection for transmitting/receiving motion data and control data to/from the controller 460 of the HMD 405. The communications interface 412 also enables the computer system 410 to wirelessly communicate control data and driver instructions, along with rendered video data to the HMD 405.

According to certain embodiments, the GPU 416 can receive instructions from the processor 414 and render three-dimensional images that correspond to those instructions. Specifically, virtual environment software programs (such as an interactive computer game) provide instructions to the processor 414 and the GPU 416. These instructions are then converted by the processor 414 and GPU 416 into virtual reality environments that are shown on the electronic display 415 of the HMD 405.

According to certain embodiments, the HMD 405 includes communications interface 418, controller 460, electronic display 415, and various other blocks, including but not limited to optics block 462, locators 464, position sensors 466, inertial measurement unit 468, and any other blocks typically associated with a HMD. The communications interface 418, like communication interface 412, may support a number of wired or wireless connections between the HMD 405 and the computer system 410 and/or other peripherals, including for a wireless connection for receiving audio/visual data that is to be rendered on the electronic display 415. The communications interface 418 can also enable the HMD 405 to wirelessly communicate data, such as motion data, control data, and color sensor information to the computer system 410.

The HMD 405 generates data from various sensors (e.g., position sensors 466) that is combined into motion and position data before transmission to the computer system 410. The computer system 410 receives the motion and position data through the communication interfaces 418 and 412 and converts the data into rendered frames of video to be displayed on the electronic display 415. When a user adjusts his or her head or eye position, the motion and position data generated from the various sensors is updated, and the video being rendered and displayed on the electronic display 415 of a HMD 405 can be regenerated. According to certain embodiments, this process involves the GPU 416 pushing the rendered video frame from a buffer to the electronic display 415. In some cases, multiple frames may be rendered and buffered using multiple frame buffers. More specifically, buffered video frame data can be encoded and sent wirelessly from the buffer to the HMD 405 via the communications interface 412. This data is received by a wireless antenna-receiver system found within or connected to communications interface 418 of HMD 405, decoded, and then sent to the controller 460.

The controller 460 can itself include one or more digital processors, one or more computer memories (e.g., a frame buffer for the video frame data and one or more additional memories for storing additional programming required to run the HMD and implement the desense prevent logic), and display drive and control circuitry.

As already introduced above in reference to the FIGS. 1-3, data transfer rates from the controller 460 to the electronic display 415 can be high enough to result in high-frequency radiation being emitted from an interface clock lane (e.g., a MIPI clock lane). Such radiation can interfere with the wireless connection made between the HMD 405 and computer system 410 via communications interfaces 418 and 412. According to certain embodiments, the memory of the controller 460 can store a program for implementing the desense prevent logic introduced above and described in more detail below. In addition, the memory can also store a lookup table that allows the HMD to choose its display interface clock frequency and wireless communication band, by taking into account both video performance requirements and preexisting knowledge of the desense problem, e.g., gained through prior test and calibration.

The above embodiment is described using the example of desense prevent logic implemented as software that is stored as computer readable instruction and stored, e.g., on the memory of the HMD's dedicated controller. However, desense prevent logic can be implemented as hardware or software without departing from the scope of the present disclosure. In addition, the desense prevent logic can be implemented solely within the HMD 405, partially within HMD 405 and partially within computer system 410, or solely within computer system 410 without departing from the scope of the present disclosure.

FIG. 5 shows a lookup table for implementing the desense prevent logic according to certain embodiments. For example, the values of the lookup table could be stored in memory on the HMD 405 and consulted by the controller of the HMD before a wireless connection is made to an end point, e.g., computer system 407. Based on a signal that is broadcast from a content-providing wireless access point or end point, the available frequency bands and associated protocols available for the wireless connection may be obtained by the controller of the HMD. According to certain embodiments, the end point may also broadcast a video performance parameter (VPP) that encodes within it, or is associated with, information regarding the minimum video performance requirements for the video content to be sent to the HMD. For example, the VPP may include a minimum/recommended frame rate, minimum/recommended resolution, minimum recommended display interface clock rate/video data transfer rate, etc. In other embodiments, the content providing end point may provide a VPP that describes the type of content to be provided, e.g., "game" or "static" content. According to certain embodiments, the VPP may be computed a number of different ways based on, e.g., the video frame data and may be computed by one or more processors within the HMD, by one or more processors within the endpoint, or both. In some embodiments, the VPP can be computed based on one or more pixel-by-pixel difference computations for consecutive frames. The above method for computing VPP is provided as merely one example and, as would be appreciated by one of ordinary skill in the art, many different methods for computing VPP are possible without departing from the scope of the present disclosure.

Based on the VPP, the controller of the HMD will configure its wireless connection and internal video data transfer rate accordingly. According to certain embodiments, the desense prevent logic may select a range of suitable display interface clock frequencies based on the value of the VPP. The desense prevent logic may then consult the connection suitability lookup table to select the wireless band for the wireless connection that will minimize the risk of desense.

For example, the HMD may detect, e.g., using beaconing and/or probing, that at a particular access point has the capability of providing a WiFi connection over either the 2.4 GHz band or the 5.0 GHz band and also may detect a VPP that indicates that the end point is seeking to provide "game" content to the HMD. Based on this VPP, the microcontroller will also have a preferred range of MIPI clock frequencies that will satisfy the video performance considerations for the content, e.g., the minimum framerate. For example, if the video performance parameter indicates "non-gaming," then the controller of the HMD will be required to have a display interface clock frequency that is set to 1.2 GHz or higher. In most situations, power consumption considerations will dictate that a lower display interface clock is preferable and thus, the microcontroller will prefer to use the lowest display interface frequency in the suitable range in the lookup table, 1.2 GHz in this example. Having selected 1.2 GHz to be the preferred display interface frequency based on the VPP, the controller of the HMD will then consult the lookup table and choose a wireless connection band that also has 'connection suitability parameter'='No' indicating that there has been no previously detected desense issue on that band when employing the chosen display interface frequency. In this example, the microcontroller will chose 5.0 GHz band to make the initial wireless connection.

In some situations, only a single WiFi band will be available for connection. Staying with the above example, the controller of the HMD will consult the lookup table and scan, e.g., from lowest to highest, all available display interface frequencies and their associated connection suitability parameters until one is found with 'connection suitability parameter'='No'. In this example, the microcontroller will choose 1.3 GHz as the MIPI clock to use for an initial connection over the 2.4 GHz band, even though 1.3 GHz is more than would be needed to provide the required video data transfer rate and even though 1.3 GHz will result in a higher power consumption rate than 1.2 GHz.

According to certain embodiments, the display interface clock frequency may be further fine-tuned, i.e., dynamically raised or lowered, after the initial wireless connection is made to prevent or minimize the risk of desense during the wireless transmission of the video data. Such tuning can be done based on one or more factors. For example, the microcontroller can monitor the bit error rate (BER) of the signal received from the endpoint and the clock frequency can be tuned to keep the BER below a certain threshold. In addition, after the initial wireless connection is made, the VPP can change, thereby forcing a change in the interface clock.

FIG. 6 shows a table that summarizes the logic that can be employed for fine-tuning of the interface clock in order to minimize the risk of desense according to certain embodiments. In some embodiments, the table shown in FIG. 6 can be stored in memory in either the HMD system or in the host device and can be consulted by the controller of the HMD system to ensure a strong connection throughout the time period where the HMS system is connected to the host device. In the simplified example shown in FIG. 6, bands available for the wireless connection are shown in the third column and in this case, the system can make an initial wireless connection over one of two wireless bands: either the 2.4 GHz band or the 5.0 GHz band. Also found in the table are a number of other columns that also represent the initial interface clock frequencies that can be chosen for the initial connection. In this example, only two interface clock frequencies are shown for the initial connection: 1.2 GHz and 1.4 GHz. However, as would be appreciated by one of ordinary skill in the art with the benefit of this disclosure, the table may include any number of interface frequencies without departing from the scope of the present disclosure.

After the initial connection, the controller of the HMD system may further fine tune the interface clock frequency away from the initial connection frequencies in an effort to reduce desense in the wireless receiver of the HMD system. The direction that the fine tuning may take, i.e., higher or lower than the initial frequency, may depend on one or more other parameters, e.g., the VPP, power consumption, and the like. In the table shown in FIG. 6, a binary VPP is used for the sake of simplicity. In this example, the VPP can take on two distinct values indicated as "High" and "Low." For content that requires a high frame rate, e.g., for gaming applications or the like, VPP will be set to 'High.' For all other content, VPP will be set to 'Low.'

The table shown in FIG. 6 is sorted according to the WiFi band (third column) with group 601 showing the two configurations associated with connections to the 2.4 GHz band and with group 603 showing the two configurations associated with connections to the 2.4 GHz band.

The first row of group 601 (for connections over the 2.4 GHz band) indicates that for VPP='LOW', the 1.4 GHz interface frequency is preferred to avoid desense because, as described above, harmonics of the 1.2 GHz clock frequency can interfere with communications in the 2.4 GHz band. As shown in the sixth column of the first row, this configuration results in a higher power consumption state than as compared with a clock frequency that could be chosen based only the VPP. Column five indicates that secondary fine tuning may be accomplished by tuning the initial interface clock higher (up) or lower (down). According to certain embodiments, tuning low may be desirable for power management, i.e., to consume less power, (e.g. if the battery state of the HMD is low) but ultimately power consumption considerations may be overridden by the need to minimize desense and therefore increase connection quality.

The second row of group 601 indicates that for VPP='HIGH', the 1.4 GHz interface frequency is preferred to avoid desense because, as described above, harmonics of the 1.2 GHz clock frequency can interfere with communications in the 2.4 GHz band. As shown in the sixth column, this configuration results in a higher power consumption state than compared with a clock frequency that could be chosen based only on the VPP. Column five indicates that secondary fine tuning may be accomplished by tuning the initial interface clock higher (Up). In this case, the option to reduce the interface frequency is eliminated because of overriding video performance concerns.

The first row of group 603 (for connections over the 5.0 GHz band) indicates that for VPP='LOW', the 1.2 GHz interface frequency is preferred for the initial connection. In this case, there is likely not a desense issue between harmonics of the 1.2 GHz clock and the 5.0 GHz band and thus, the interface clock is chosen over the faster 1.4 GHz clock primarily to reduce power consumption. According to certain embodiments, the system can continually monitor connection quality an increase or decrease the interface clock frequency to increase connection quality as described in further detail below in reference to FIGS. 7-9.

The second row of group 603 indicates that for VPP='HIGH', the 1.4 GHz interface frequency is preferred for the initial connection. In this case, there is likely not a desense issue between harmonics of the 1.2 GHz clock and the 5.0 GHz band and thus, the interface clock is chosen primarily to satisfy the video performance requirements despite the fact that this clock will result in a higher power consumption than the lower 1.2 GHz clock. According to certain embodiments, the system can continually monitor connection quality an increase the frequency interface clock to increase connection quality. In this example, the system is instructed to increase the frequency above the 1.4 GHz frequency if desense is detected. The "decrease" option is eliminated because of the minimum video requirements.

As would be appreciated by one of ordinary skill in the art with the benefit of this disclosure, the parameter space employed by the HMD system and encapsulated in the tables shown in FIGS. 5-6 can include many more frequencies and connection bands without departing from the scope of the present disclosure. In addition, it is possible to consider and characterize the desense issue across individual wireless channels within each available band rather than merely considering the bands generally. Likewise, while the example described above used the 2.4 GHz and 5.0 GHz WiFi bands as an example, as would be appreciated by one of ordinary skill in the art with the benefit of this disclosure, the systems and methods disclosed here can be employed to reduce desense across any type of wireless connection where the high-frequency display interface clock of the HMD system risks interfering with the wireless data connection.

Figure 7:
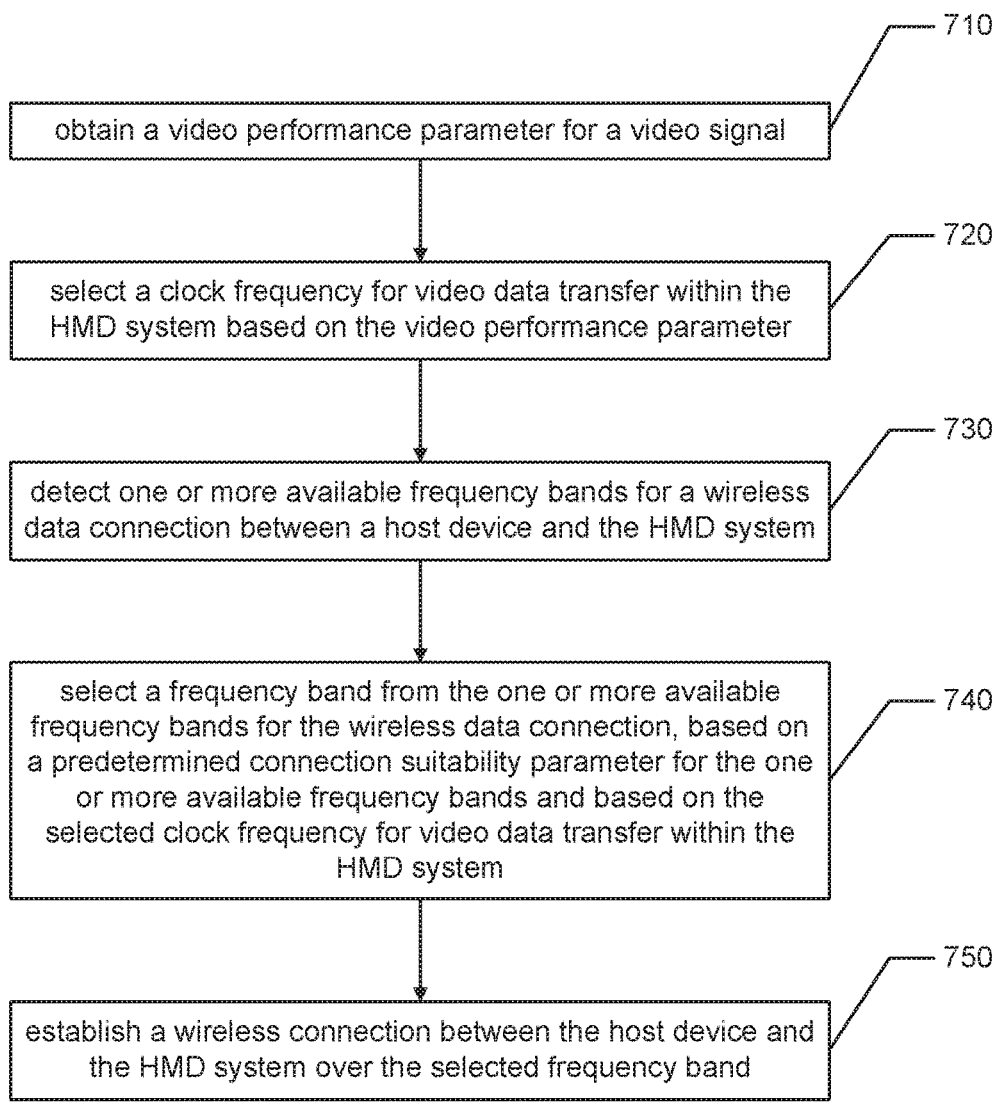
FIG. 7 shows a flow chart for a method of operating an HMD system in a way that reduces desense in a wireless receiver according to certain embodiments.

FIG. 7 shows a flow chart for a method of operating an HMD system, e.g., a VR/AR headset, in a way that reduces desense in a wireless receiver according to certain embodiments. More specifically, FIG. 7 describes a method by which the video interface clock frequency and the wireless connection band can be chosen at the time a wireless connection is initially made by reference to a lookup table that can be stored in memory within the HMD and/or the host device.

In step 701, a video performance parameter (VPP) for a video signal is obtained by a controller in the headset. For example, as described above in reference to FIG. 4, the controller 460 may extract the VPP from a signal that is broadcast from the host device, e.g., computer system 410 via a wireless access point within a network that includes the computer system 410. According to certain embodiments, the video signal corresponds to video data frames to be displayed on a display of the HMD system and the VPP can take on a value that corresponds to the type of content to be displayed on the HMD and/or can also take on a value or encode for one or more video performance requirements, e.g., minimum frame rate, minimum data transfer rate, etc., for displaying the content on the HMD without error. As described above in reference to FIGS. 1-3, the video data frames may be generated at the endpoint by one or more processors, e.g., a GPU, according to an application (e.g., a VR/AR game) that is being executed on one or more processors of the endpoint (e.g., processor 414) of FIG. 4.

In step 720, the controller of the HMD system can select a clock frequency for video data transfer within the HMD system based on the VPP. For example, as described above, if the VPP indicates that game content is to be displayed on the HMD, then the microcontroller will set the initial clock frequency for the HMD's internal video interface to be 1.4 GHz. Likewise, if the video to be displayed does not require a high frame rate, then the microcontroller could set the interface clock to an initial frequency that is lower, e.g., 1.2 GHz.

In step 730, the HMD detects one or more available frequency bands for a wireless data connection between a host device and the HMD system. For example, if the wireless access point is a WiFi router, then the HMD could detect that that the router is capable of transmitting data over the two WiFi frequency bands at 1.2 GHz and 5.0 GHz.

In step 740, the microcontroller of HMD selects a frequency band from the available frequency bands for the wireless data connection. To do so, the microcontroller can consult a lookup table that stores one or more values for predetermined connection suitability parameters for all possible combinations of interface clock frequency and wireless connection band frequencies. In accordance with one or more embodiments, the predetermined connection suitability parameter may indicate a likelihood of having a desense issue with a particular (interface clock, wireless connection frequency) ordered pair, as described above, in reference to FIGS. 5-6. One of ordinary skill will appreciate that the lookup table can take many different forms without departing from the scope of the present disclosure and that the example shown in FIGS. 5-6 are merely illustrative.

In step 750, the controller of the HMD establishes a wireless connection between the host device and the HMD system over the selected frequency band. According to certain embodiments, the wireless connection is made according to any suitable communication protocol, e.g., those in accordance with the IEEE 802.11 standard. Once the wireless connection is made, the HMD is prepared to receive the wireless video signal over the chosen wireless band using the chosen interface clock frequency. As described in further detail below in reference to FIG. 9, if desense is later detected after the initial connection is made, the controller of the HMD will take action in order to reduce the problem, e.g., by shifting the interface clock frequency and/or by switching bands over which to communicate with the host device.

Figure 8:
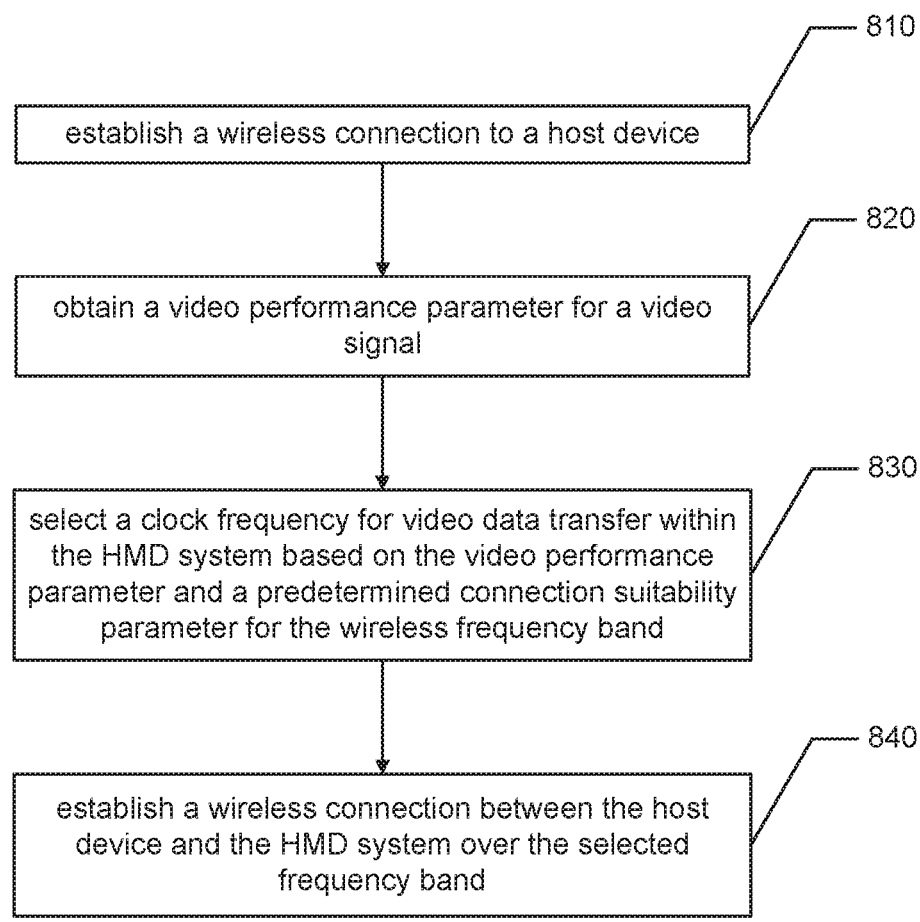
FIG. 8 shows a flow chart for a method of operating an HMD system in a way that reduces desense in a wireless receiver according to certain embodiments.

FIG. 8 shows a flow chart for a method of operating an HMD system, e.g., a VR/AR headset, in a way that reduces desense in a wireless receiver according to certain embodiments.

In step 810, the controller of the HMD system establishes a wireless connection to a host device. According to certain embodiments, the controller of the HMD may choose one of several available bands over which to make the connection, as described above. Alternatively, in certain situations, only a single band is available for the wireless host device to communicate with the HMD and thus the HMD system will connect over the only available wireless band, e.g., the 2.4 GHz band in this example.

In step 820, the controller of the HMD system receives a video performance parameter from the host device as already described above in reference to FIGS. 5-7. According to certain embodiments, an application running on the host device can generate the VPP and then the VPP is passed to the HMD system over the wireless connection with other management data, thereby indicating to the HMD system what type of video data it will be receiving (e.g., dynamic "game" data) from the host device.

In step 830, the controller of the HMD system will initialize the data transfer characteristic of the internal video interface by selecting a clock frequency based on the received VPP. As described above, according to certain embodiments, the video interface may be a MIPI display interface and the controlled of the HMD may consult a lookup table that is stored in memory on the HMD system where the lookup table will tabulate all available (interface clock, wireless connection band) pairs and whether or not the wireless connection has a high risk of suffering from desense based on prior measurements/tests. According to certain embodiments, the lookup table can store a third parameter, referred to herein as a "predetermined connection suitability parameter" that indicates whether or not the wireless connection has a high risk of desense for any given interface clock frequency. Accordingly, the controller of the HMD will select a clock frequency for which the predetermined connection suitability parameter indicates the connection will have a low risk of desense, even if that clock frequency is higher than what is required from a consideration of the VPP alone. For example, if the VPP indicates that 1.2 GHz interface clock frequency would provide sufficient data transfer rate, but the predetermined connection suitability parameter indicates that this frequency will result in desense (e.g., due to its second harmonic generating interference in the 2.4 GHz wireless connection band), the controller can choose to increase the frequency to 1.4 GHz, even though such a consideration may result in slightly higher overall power consumption for the HMD system. In other situations, the 5 GHz connection band would be preferred for this VPP but, in this particular example we are assuming that this band is not available and thus, the controller of the HMD system will alter the interface clock frequency to reduce the risk of desense because the interface clock frequency is the only variable available over which to optimize the connection.

In step 840 the controller of the HMD system establishes a wireless connection with the host device, e.g., via a wireless access point as described above in reference to FIGS. 1-7. After the connection is initialized, the HMD system can begin receiving video data and displaying it on the electronic display of the HMD.

Figure 9:
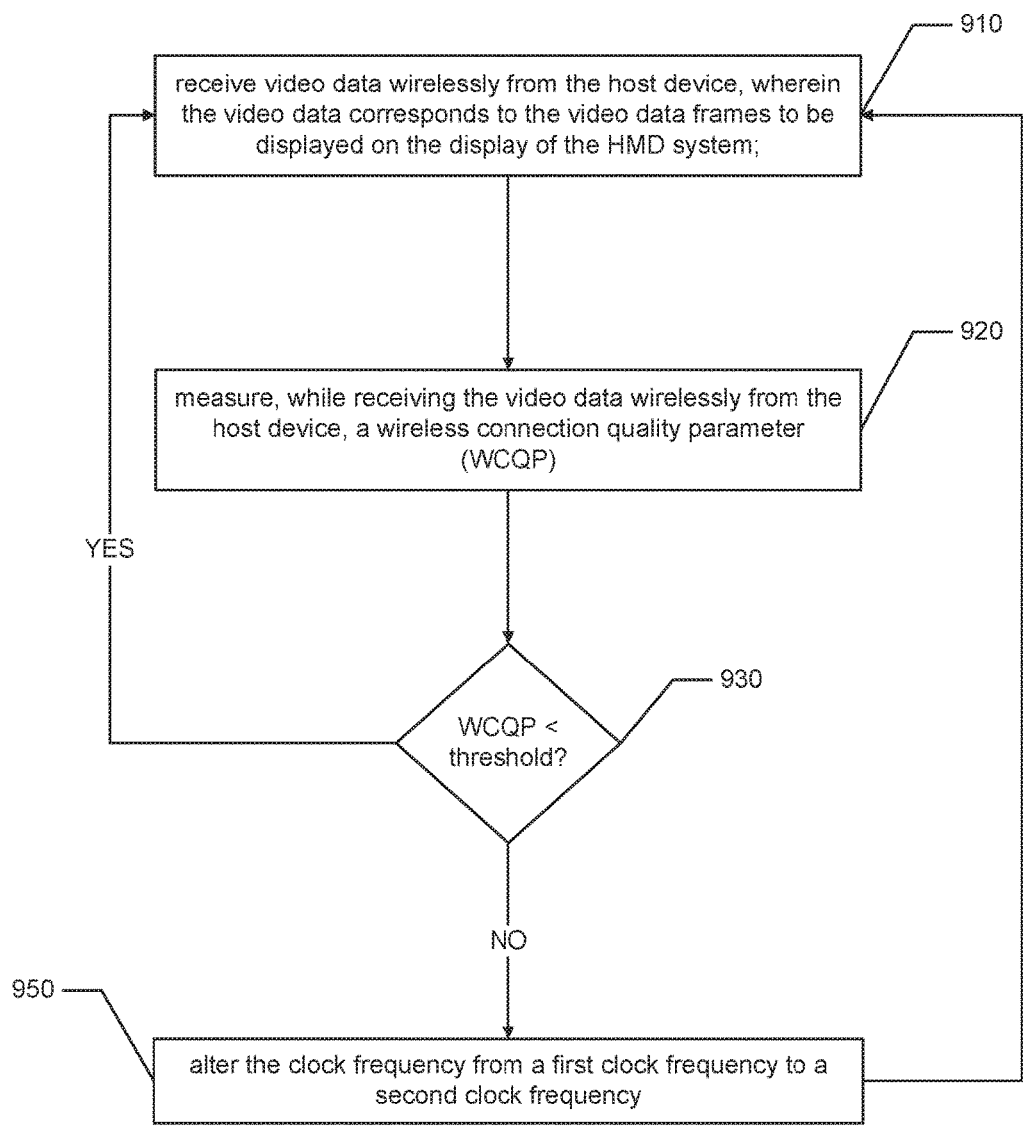
FIG. 9 shows a flow chart for a method of operating an HMD system in a way that reduces desense in a wireless receiver according to certain embodiments.

FIG. 9 shows a flow chart for a method of operating an HMD system, e.g., a VR/AR headset, in a way that reduces desense in a wireless receiver according to certain embodiments. According to certain embodiments, the method of FIG. 9 can be employed by the controller of the HMD so that the desense issue is minimized during the time the wireless connection is made and when video data is being transferred to the HMD system.

In step 910, the HMD receives video data wirelessly from the host device. For example, one or more wireless receivers/antennas within the communications interface 418 may receive video data that corresponds to video data frames to be displayed on the display of the HMD system.

In step 920, some form of wireless connection quality parameter (WCQP) is measured as the HMD system receives the video data over the wireless connection. According to certain embodiments, the WCQP can be a bit error rate (BER) or the like that measures the number of erroneous bits in the received wireless video signal over a period of time.

In step 930, the measured WCQP is compared to a predetermined threshold WCQP value. If the measured BER is below the threshold (indicating that the error rate is low enough to not perceptibly affect the performance of the display) the HMD system will continue to operate the display interface at the initially chosen clock frequency. In this case, the method returns to step 910 and measures the BER again at some later time with the method proceeding again as described above. In this manner, the HMD system can monitor the WCQP in near real time and react accordingly if desense becomes an issue.

If, in step 930, the WCQP is above the threshold (indicating that display interface clock induced desense may have become an issue), the HMD system will tune the interface clock away from the initially chosen frequency to a new frequency, e.g. as described above in reference to FIGS. 4-8.

The WCQP is then measured at this new frequency and compared to the predetermined threshold. According to certain embodiments, the new frequency and the initial frequency may both be suitable frequencies that satisfy the required video performance specifications given the current VPP. That is to say, absent any desense considerations, the system would have no reason to alter the clock frequency from the first value. In addition, according to certain embodiments, the controller of the HMD might even increase the clock frequency to reduce the desense issue so that the new frequency is greater than the initially chosen frequency. Such a change is counter to what would be preferable given the VPP alone, because a higher frequency can result in a higher power consumption. However, according to certain embodiments, video performance and desense considerations can trump power consumptions concerns.

In situations such as that described immediately above, where the interface clock is set by the controller to be higher than that required to support the required data transfer rate given the value of the VPP, the video data stream can be periodically "blanked" to ensure that a rate of the video data transfer to the display corresponds to a required data transfer rate based on a frame rate and a resolution of the display of the HMD system. Such a blanking technique can include inserting one or more blank (zero data) frames or subframes within the data stream thereby resulting in one or more empty packets being sent along with the video data. Accordingly, despite the higher interface clock the data throughput can be made to match the data throughput at the lower frequency.

According to certain embodiments, in step 950, the clock frequency can be altered by other variables in addition to the WCQP. For example, the controller of the HMD system can change the interface clock frequency in response to a change in the VPP. For example, if the VPP changes to indicate that the displayed content is changing from "dynamic" to "static", then the controller may choose to reduce the interface clock frequency to conserve power.

In the above manner, the quality of the connection can be periodically monitored and the system can take action to increase the quality when the system detects that the quality of the connection to be too poor to support the performance demands required for the type of content that is to be displayed on the display of the HMD in response to the application running on the host device.

The desense prevent logic and methods described herein may be automated and therefor implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIGS. 7-9 and referred to in the other figures above is intended to be illustrative and non-limiting. Although FIGS. 7-9 depict the various steps occurring in a particular sequence or order, this is not intended to be limiting. In certain embodiments, the steps may be performed in some different order or some steps may also be performed in parallel.

What is claimed is:
1. A method of operating a head mounted display (HMD) system, the method comprising:
obtaining a video performance parameter for a video signal, wherein the video signal corresponds to video data frames to be displayed on a display of the HMD system;

selecting a clock frequency for video data transfer within the HMD system based on the video performance parameter;
detecting one or more available frequency bands for a wireless data connection between a host device and the HMD system, wherein the host device is external to the HMD system;
selecting a frequency band from the one or more available frequency bands for the wireless data connection, based on a predetermined connection suitability parameter for the one or more available frequency bands and based on the selected clock frequency for video data transfer within the HMD system; and
establishing a wireless connection between the host device and the HMD system over the selected frequency band.

2. The method of claim 1, further comprising:
receiving video data wirelessly from the host device, wherein the video data corresponds to the video data frames to be displayed on the display of the HMD system;
measuring, while receiving the video data wirelessly from the host device, a wireless connection quality parameter; and
altering the clock frequency from a first clock frequency to a second clock frequency, based on the wireless connection quality parameter and the video performance parameter, to improve a connection quality of the wireless connection.

3. The method of claim 2, wherein the second clock frequency is greater than the first clock frequency and both the first and second clock frequencies satisfy a minimum video data transfer rate associated with the video performance parameter.

4. The method of claim 1, further comprising:
receiving video data wirelessly from the host device, wherein the video data corresponds to the video data frames to be displayed on the display of the HMD system;
measuring, while receiving the video data wirelessly from the host device, a wireless connection quality parameter; and
altering the clock frequency from a first clock frequency to a second clock frequency in response to a change in the video performance parameter from a first video performance parameter to a second video performance parameter, wherein the second clock frequency is chosen based on a value of the wireless connection quality parameter measured at the second clock frequency and based on the second video performance parameter.

5. The method of claim 4, wherein the second clock frequency is greater than the first clock frequency and both the first and second clock frequencies satisfy a minimum video data transfer rate associated with the second video performance parameter.

6. The method of claim 1, further comprising transferring video data to a display of the HMD system, wherein the video data is periodically blanked to ensure that a rate of the video data transfer to the display corresponds to a required data transfer rate based on a frame rate and a resolution of the display of the HMD system.

7. The method of claim 1, further comprising:
receiving video data wirelessly from the host device, wherein the video data corresponds to the video data frames to be displayed on the display of the HMD system, wherein the video performance parameter corresponds to a required frame rate for displaying the received video data on the display of the HMD system.

8. The method of claim 2, wherein improving the connection quality of the wireless connection comprises increasing a sensitivity of a wireless receiver of the HMD system.

9. A method of operating a head mounted display (HMD) system, the method comprising:
establishing a wireless connection to a host device,
wherein the host device is external to the HMD system, and
wherein the wireless connection uses a wireless frequency band required by the host device;
obtaining a video performance parameter for a video signal, wherein the video signal corresponds to video data frames to be displayed on a display the HMD system; and
selecting a clock frequency for video data transfer within the HMD system based on the video performance parameter and a predetermined connection suitability parameter for the wireless frequency band.

10. The method of claim 9, wherein the clock frequency is higher than a clock frequency that results in a video data transfer rate that satisfies the video performance parameter.

11. The method of claim 9, further comprising:
receiving video data wirelessly from the host device, wherein the video data corresponds to the video data frames to be displayed on the display of the HMD system;
measuring, while receiving the video data wirelessly from the host device, a wireless connection quality parameter; and
altering the clock frequency from a first clock frequency to a second clock frequency, based on the wireless connection quality parameter and the video performance parameter, to improve a connection quality of the wireless connection.

12. The method of claim 11, wherein the second clock frequency is greater than the first clock frequency and both the first and second clock frequencies satisfy a minimum video data transfer rate associated with the video performance parameter.

13. The method of claim 11, further comprising transferring video data to a display of the HMD system, wherein the video data is periodically blanked to ensure that a rate of the video data transfer to the display corresponds to a required data transfer rate based on a frame rate and a resolution of the display of the HMD system.

14. The method of claim 13, wherein the video data is periodically blanked by inserting one or more empty packets into the video data such that the rate of the video data transfer to the display is reduced relative to a data transfer rate that would be present at the second clock frequency for video data having no empty packets.

15. The method of claim 9, further comprising:
receiving video data wirelessly from the host device, wherein the video data corresponds to the video data frames to be displayed on the display of the HMD system, wherein the video performance parameter corresponds to a required frame rate for displaying the received video data on the display of the HMD system.

16. The method of claim 11, wherein improving the connection quality of the wireless connection comprises increasing a sensitivity of a wireless receiver of the HMD system.

17. A head mounted display (HMD) system comprising:
an electronic display that displays video data frames;

a wireless receiver for receiving the video data frames from a host device over a wireless connection; and one or more digital processors configured to:

establish the wireless connection to the host device,
wherein the host device is external to the HMD system, and
wherein the wireless connection uses a wireless frequency band required by the host device;

obtain a video performance parameter for a video signal, wherein the video signal corresponds to the video data frames to be displayed on the electronic display of the HMD system; and select a clock frequency for video data transfer within the HMD system based on the video performance parameter and a predetermined connection suitability parameter for the wireless frequency band.

18. The HMD system of claim 17, wherein the clock frequency for video data transfer within the HMD system is higher than a clock frequency that results in a video data transfer rate that satisfies the video performance parameter for the video signal.

19. The HMD system of claim 17, wherein the one or more digital processors are further configured to:

receive video data wirelessly from the host device, wherein the video data corresponds to the video data frames to be displayed on the electronic display of the HMD system;

measure, while receiving the video data wirelessly from the host device, a wireless connection quality parameter; and alter the clock frequency for video data transfer within the HMD system from a first clock frequency to a second clock frequency, based on the wireless connection quality parameter and the video performance parameter for the video signal, to increase a sensitivity of a wireless receiver to the received video data.

20. The HMD system of claim 19, wherein the second clock frequency is greater than the first clock frequency and both the first and second clock frequencies satisfy a minimum video data transfer rate associated with the video performance parameter.

* * * * *